(12) United States Patent
Couch et al.

(10) Patent No.: US 10,181,274 B2
(45) Date of Patent: Jan. 15, 2019

(54) WAVEGUIDE BASED ILLUMINATED DISPLAY SYSTEM WITH REMOTELY POSITIONED LIGHT SOURCES

(71) Applicant: Sun Chemical Corporation, Parsippany, NJ (US)

(72) Inventors: Erick Christopher Couch, Santa Barbara, CA (US); Andrew Michael Bakaysza, Palos Verdes Estates, CA (US)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 308 days.

(21) Appl. No.: 15/298,705

(22) Filed: Oct. 20, 2016

(65) Prior Publication Data
US 2017/0115443 A1    Apr. 27, 2017

Related U.S. Application Data

(60) Provisional application No. 62/244,222, filed on Oct. 21, 2015.

(51) Int. Cl.
| | |
|---|---|
| *G09F 13/20* | (2006.01) |
| *F21V 8/00* | (2006.01) |
| *G09F 13/18* | (2006.01) |

(52) U.S. Cl.
CPC ........... *G09F 13/20* (2013.01); *G02B 6/0003* (2013.01); *G09F 13/18* (2013.01)

(58) Field of Classification Search
CPC ........ G09F 13/20; G09F 13/18; G02B 6/0003
See application file for complete search history.

(56) References Cited

U.S. PATENT DOCUMENTS

| | | |
|---|---|---|
| 6,236,799 B1 | 5/2001 | Huh et al. |
| 6,240,664 B1 | 6/2001 | Hjaltason |
| 6,548,956 B2 | 4/2003 | Forrest et al. |

(Continued)

FOREIGN PATENT DOCUMENTS

| | | |
|---|---|---|
| GB | 402825 A | 12/1933 |
| WO | 2015033950 A1 | 3/2015 |

OTHER PUBLICATIONS

International Searching Authority, International Search Report issued in PCT Application No. PCT/US2016/058111 dated Feb. 6, 2017, 11 pages.

*Primary Examiner* — David V Bruce
(74) *Attorney, Agent, or Firm* — Charles C. Achkar; Ostrolenk Faber LLP.

(57) ABSTRACT

A display system 10 comprising a remotely positioned light source 21 configured to produce ultra-violet, violet, or blue light, a first and second waveguides 14, 16, and a first propagation direction changing feature 20. The first waveguide 14 that receives the light from the remotely positioned light source 12. The second waveguide 16 is disposed at an angle relative to the first waveguide 14. The second waveguide 16 includes a photoluminescent printed image 18. The first propagation direction changing feature 20 reorients the direction of the light into the second waveguide 16, making image 18 visible. A visible light source may illuminate a translite graphic layer 26 or a physical object providing an image that is viewable from the display system when the second light source is illuminated and the first remotely positioned light source is not illuminated.

32 Claims, 3 Drawing Sheets

(56) References Cited

U.S. PATENT DOCUMENTS

| | | |
|---|---|---|
| 6,842,170 B1 | 1/2005 | Akins et al. |
| 7,123,796 B2 | 10/2006 | Steckl et al. |
| 7,430,355 B2 | 9/2008 | Heikenfeld et al. |
| 7,446,827 B2 | 11/2008 | Ko et al. |
| 7,559,684 B2 | 7/2009 | Okuda |
| 7,845,826 B2 | 12/2010 | Aylward et al. |
| 8,075,982 B2 | 12/2011 | Donahue |
| 8,690,412 B2 | 4/2014 | Franklin et al. |
| 9,170,436 B2 | 10/2015 | Gibson et al. |
| 2004/0025388 A1 | 2/2004 | Coates |
| 2011/0277361 A1* | 11/2011 | Nichol ................ G02B 6/0018 40/541 |
| 2012/0106122 A1 | 5/2012 | Ryu et al. |
| 2014/0092620 A1 | 4/2014 | Tissot |
| 2015/0253487 A1* | 9/2015 | Nichol ................ G02B 6/0036 362/610 |
| 2016/0231491 A1 | 8/2016 | Couch et al. |

\* cited by examiner

WAVEGUIDE BASED ILLUMINATED DISPLAY SYSTEM WITH REMOTELY POSITIONED LIGHT SOURCES

RELATED APPLICATION

The present application claims priority to U.S. Ser. No. 62/244,222 filed Oct. 21, 2015, the disclosure of which is hereby incorporated herein by reference in its entirety.

FIELD OF THE INVENTION

The invention relates to light emissive display systems and, more specifically, to light emissive display system devices based upon lightwave coupling in combination with subject matter illuminated with visible light.

BACKGROUND OF THE INVENTION

Photoluminescent printed waveguides based on lightwave coupling can be produced using various photoluminescent colorants which are transparent when non-energized, yet emit color when subjected to ultra-violet, violet, or blue light energy. By printing on clear waveguides, multiple waveguide layers can be stacked and alternately energized to produce engaging motion effects. This technology has the benefit over competing technologies such as LCD in that it is a low cost printed approach which can be produced in sizes and shapes other than the standard ratio rectangular LCD products. Unlike LCDs, these display systems can also be contour cut or formed into three dimensional shapes. Additionally, by incorporating a back lit or edge lit visible light illuminated graphic behind the photoluminescent layer(s), one can further extend graphic life and the ability to support high color content artwork while maintaining desirable features of low cost and flexible geometry. The extreme of high color content artwork is white whereas the extreme of low color content artwork is black.

Placing an edge lit or back lit visible light illuminated graphic (for example a DURATRANS®) behind the photoluminescent layer(s) has the benefits of long illuminated life and the ability to support up to 100% white content. However, even in the non-illuminated state subjected only to ambient light, these transparencies can exhibit much visible color and therefore may not provide a sufficiently dark background for the photoluminescent layer(s).

Using photoluminescent layers to present imagery in front of one or more physical objects wherein the photoluminescent layers are largely transparent in the non-energized state such that the physical object(s) may be viewed through the photoluminescent layer(s) provides a compelling aesthetic presentation. The physical object(s) can optionally be placed in an enclosed structure such that ambient light is prevented from entry except through the photoluminescent layers. With emissive phosphors, it is impossible to create darkness. Primary RGB colors combine to form white. Therefore, provision of a dark background for image contrast is needed. This background can be provided by a dark ambient background such as in a dimly lit room, or by placing a dark surface behind the photoluminescent printed panels.

In photoluminescent printed waveguides, ultra-violet, violet, or blue excitation light is consumed by the presence of phosphors. The greater the amount of phosphors, the greater the requirement for excitation energy. In practice, producing an emissive display system with high light colored content consumes much more energy than one containing largely dark colored content. This limits the amount of photoluminescent ink which can be excited, and hence restricts the kind of artwork which can be sufficiently energized using this approach.

In waveguide based display systems where a beam angle limited light source is used, light needs to be delivered to the graphic region with useful distribution. To achieve a useful light distribution, some waveguide distance from the light source must be provided to allow the light to spread. This region wherein light is not sufficiently spread increases overall display system size and cost, and generally reduces appeal.

When illuminating a waveguide display system with multiple beam angle limited light sources, the periodicity of the light source placement and beam expansion angle determine the distance into the waveguide where the light will merge with lighting from the adjacent light source. For edge lit systems, this creates a generally undesirable light mixing region wherein some portions of the waveguide have excitation energy and others do not. This region is generally not useful for illuminating graphics. It is often hidden from view behind framing. When designing display systems, one must often include this non-graphic light spreading region which adds to waveguide cost.

Many commercial display system geometries are very long and thin. One such example is the front edge of a store aisle shelf. This is just one example of many relevant examples. In the current art, the required light spreading region is so large as to require a large percentage of the viewable area to be a non-graphic light spreading region to an extent that the result is unappealing. For example, on a 1.5 inch tall shelf strip in the current art, with light sources on half inch centers and a +/−60 degree beam angle, approximately ⅜" of the waveguide must be non-graphic to allow for light mixing. For these reasons, many thin geometry market opportunities are not viable or sufficiently appealing.

Many non-graphical features in the current art consume valuable visual real estate. For example, the light source height, the light source circuit board, and the supporting frame. Often the supporting frame must include additional geometry for routing wires. Often, illumination sources are provided on more than one edge of a display system, further reducing the visible graphic area. This makes small display systems unattractive since so much of the viewable area is consumed. This also is generally a negative impact on larger display systems as advertisers generally want to maximize use of visible area.

For waveguide based transparent or semi-transparent multi-layer artwork display systems, there is currently much opportunity for installation of individual layers in the incorrect position and orientation. Being transparent or semi-transparent, it is challenging to determine which is the top, bottom, right, left, front, and back for a stack of image layers. As the number of layers increase, the chance for error increases.

In the current art, a significant cost driver for waveguide printed graphics is the cost of the waveguide itself. When printing multi-layer display systems, this cost is multiplied. Any non-graphic waveguide region required for light mixing adds cost over time as graphics are refreshed. For example, for 0.118 inch thick acrylic, the cost per square foot is around $2/square foot. For a 36 inch shelf strip×⅜ inch mixing region×2 layers=40 cents. Over the life of a display system say 4 campaigns/year for 3 years=12 campaigns=$5.40.

In the current art, a large cost and weight driver for waveguide printed graphics is the material thickness.

Light distribution in waveguide based display systems using beam angle limited light sources poses numerous difficulties. If no condensing optics are used, the waveguide must be at least similar in cross sectional height to the light source in order to receive the light. Furthermore, most light sources used in waveguide based display systems have a large beam angle distribution. For example +/−60 degrees is common. Light wave propagation across the waveguide is highly influenced by this angular distribution. The higher the beam angle, the greater the frequency of surface touches. The greater the frequency of surface touches which hit photoluminescent phosphors, the quicker the light energy will be consumed. Incorporating optics to shape the light can improve the distribution of light in the waveguide, and also reduce the required waveguide thickness. However, the effectiveness of such optics is highly related to the optic size. An effective optic can be much larger than the waveguide thickness. Incorporation of such optics directly adjacent to the photoluminescent or visible light waveguide requires additional geometry which can further reduce the visible graphic region. For multi-layer display systems, it is desirable to stack the layers close together. When layers are stacked close to one another, the challenge is further compounded in the stacking direction as sizable optics for shaping light into one layer can interfere with positioning the adjacent layer.

Optics to shape beam angle distributed source light into the edge of a very thin flexible waveguide has some practical limits. As the waveguide thickness is reduced, the need for precision alignment increases and also the required optic geometry size increases. For multi-layer display systems, it is desirable to stack the layers close together. When layers are stacked close to one another, the challenge is further compounded in the stacking direction as sizable optics for shaping light into one layer can interfere with positioning the adjacent layer. Incorporation of such optics directly adjacent to the edge of the photoluminescent or visible light waveguide requires additional geometry which can further reduce the visible graphic region.

In addition to flat display systems, single or multi-layer three dimensional waveguide display systems also may lose valuable graphic viewable area when the source lights are placed directly abutted to the edges of the waveguide. For instance, a curved cylindrical waveguide display system requires a seam beneath which the light sources are hidden.

In addition to rectangular display systems, single or multi-layer non-rectangular waveguide display systems also lose valuable graphic viewable area when the source lights are placed directly abutted to the edges of the waveguide.

When illuminating a waveguide display system with light sources placed directly abutted to the edges of the waveguide, the light source can become directly visible to the observer when not sufficiently hidden behind a feature such as framing. To ensure that direct view of such light sources is avoided, the framing or other obscuring material must extend far enough that the light sources are hidden from observer view. This may require additional geometry which can further reduce the visible graphic region.

An important application is placing one or more transparent or semi-transparent photoluminescent waveguide layer(s) in front of one or more physical objects such that the waveguide layer(s) can present graphics and then become transparent allowing the physical object(s) to be seen. For example, physical product such as a bottle of perfume can be placed behind one or more waveguide layers such that when energized, the waveguide panel presents an illuminated graphic feature, yet which is also capable of allowing the viewer to see through the panel to the bottle of perfume. Another example is for a cooler door. Often the supporting frame must include additional geometry for routing wires. Often, illumination sources are provided on more than one edge of a such waveguide display systems, further reducing the visible graphic area. This makes small display systems unattractive since so much of the viewable area is consumed. This also is generally a negative impact on larger display systems as advertisers generally want to maximize use of visible area.

Therefore, a cost efficient display system is needed to address these fundamental limitations enumerated above.

Therefore, a solution capable of expanding a single light source beam prior to illuminating a graphic region is desirable.

Therefore, a solution capable of mixing multiple periodic light source beams prior to illuminating a graphic region is desirable.

Therefore, a solution capable of supporting single or multi- layered graphic display systems with very thin visible areas is desirable.

Therefore, a solution capable of minimizing non-graphic region display system geometry facing the observer is desirable.

Therefore, a solution capable of receiving a keyed mistake proof multi-panel installation geometry is desirable.

Therefore, a solution capable of minimizing cost of replacement graphics by eliminating the non-graphic light mixing region is desirable.

Therefore, a solution capable of minimizing waveguide thickness is desirable.

Therefore, a solution which enables light shaping optics to be positioned such that they do not reduce the graphic region visible to the observer is desirable.

Therefore, a solution which enables light shaping optics to introduce excitation energy into thin film yet which do not reduce the visible graphic region is desirable.

Therefore, a solution which delivers light to single or multi-layered display system which is not flat (curved or thermoformed) is desirable.

Therefore, a solution which introduces light into a waveguide based single or multi-layered contour cut display system is desirable.

Therefore, a solution which eliminates visibility of the source lights from view is desirable.

Therefore, a solution capable of minimizing non-graphic region display system geometry facing the observer when placing single or multi-layer transparent or semi-transparent photoluminescent waveguide panels in front of one or more physical objects is desirable.

SUMMARY OF THE INVENTION

In accordance with an embodiment of this invention, a display system includes a remotely positioned light source, a first waveguide, a second waveguide, and a first propagation direction changing feature. The remotely positioned light source is configured to produce ultra-violet, violet, or blue light. The first waveguide that receives the light from the remotely positioned light source. The second waveguide is disposed at an angle relative to the first waveguide. The second waveguide contains a photoluminescent printed image. The first propagation direction changing feature receives the light from the first waveguide and reorients the direction of the light into the second waveguide.

In accordance with an embodiment of this invention, a method of displaying a photoluminescent printed image.

The method includes producing ultra-violet, violet, or blue light using a remotely positioned light source. The method also includes transferring the light to a first waveguide that receives the light from the remotely positioned light source. The method also includes reorienting the direction of the light using a first propagation direction changing feature after receiving the light from the first waveguide. The method also includes transferring the light to a second waveguide containing a photoluminescent printed image; the second waveguide being disposed at an angle relative to the first waveguide.

In accordance with an embodiment of this invention, a display system is comprised of one or more photoluminescent printed waveguides based on lightwave coupling. The photoluminescent printing may be directly onto the waveguide or optionally onto film which is coupled to the waveguide. One or more ultra-violet, violet, or blue light sources is introduced into the photoluminescent printed waveguide by way of remotely positioned light sources in combination with one or more propagation direction changing features. The propagation direction changing features allow beam angle limited source light to spread such that the light is sufficiently spread or mixed prior to introduction into the photoluminescent waveguide.

In accordance with an embodiment of this invention, a display system is comprised of one or more photoluminescent printed waveguides, an edge or back lit visible light illuminated graphic in the posterior position, and optionally a light filter placed in between the translite graphic layer and the adjacent photoluminescent layer(s). The light filter may be rigid or flexible. Light is introduced into the edge of the photoluminescent printed waveguide by way of remotely positioned light sources in combination with one or more propagation direction changing features. The propagation direction changing features allow beam angle limited source light to spread such that the light is sufficiently distributed prior to introduction into the photoluminescent waveguide. The translite graphic layer provides a display system feature which can be illuminated for a very long time without significant color loss. The translite graphic layer can contain up to 100% white content. The translite graphic layer is illuminated by edge or back lighting, of which there are many commercially available solutions. The optional light filter reduces the visibility of the translite graphic layer such that it provides a sufficiently dark background for the anterior photoluminescent layer(s) when the translite graphic layer is not illuminated by its associated edge or back lighting.

In accordance with an embodiment of this invention, a display system is comprised of one or more photoluminescent printed waveguides based on lightwave coupling wherein the light sources are introduced into the photoluminescent layers remotely and the light is turned into the observer visible waveguide via propagation direction changing features which maximize visible graphic area.

In accordance with an embodiment of this invention, a display system is comprised of one or more photoluminescent printed waveguides based on lightwave coupling, and an edge or back lit visible light illuminated graphic in the posterior position with an optional light filter placed in between the translite graphic layer and the adjacent photoluminescent layer. The light sources are introduced into the photoluminescent layer remotely and the light is turned into the observer visible area via propagation direction changing features which maximize visible graphic area. Optionally light sources are introduced into the visible light illuminated layer remotely and the light is turned into the observer visible area via propagation direction changing features which maximize visible graphic area.

In accordance with an embodiment of this invention, a display system is comprised of an edge lit visible light illuminated graphic. Light is introduced into the system remotely and the light is turned into the observer visible area via propagation direction changing features which maximize visible graphic area.

In accordance with an embodiment of this invention, a display system is comprised of one or more photoluminescent printed waveguides based on lightwave coupling, and optionally an edge or back lit visible light illuminated graphic in the posterior position with an optional light filter placed in between the translite graphic layer and the adjacent photoluminescent layer(s). The image layer stack is keyed by staggering the photoluminescent printed waveguide ends and their associated receiving propagation direction changing features such that the stack can only be installed in the correct position and orientation.

In accordance with an embodiment of this invention, a display system is comprised of one or more photoluminescent printed waveguides based on lightwave coupling, and optionally an edge or back lit visible light illuminated graphic in the posterior position. Light is introduced into the waveguide by way of remotely positioned light sources in combination with one or more propagation direction changing features. The propagation direction changing features reduce the out of plane angular light distribution such that waveguide thickness can be reduced while maintaining sufficient light distribution to support photoluminescent or visible light illuminated graphic area. Propagation direction changing features may include, but are not limited to, collimating (such as a Fresnel lens), condensing, grating, and normal to in-plane lens features (such as a reflective surface, a refractive surface or TIR features that include a grating) known to those skilled in the art. Propagation direction changing features may abut the end of the waveguide(s) or may introduce the light into the waveguide through the planar surface.

In accordance with an embodiment of this invention, a display system is comprised of one or more non-planar photoluminescent printed waveguides, and optionally a non-planar edge or back lit visible light illuminated graphic in the posterior position with an optional light filter placed in between the translite graphic layer and the adjacent photoluminescent layer. Light is introduced into the edge of the photoluminescent printed waveguide by way of remotely positioned light sources in combination with one or more propagation direction changing features. The propagation direction changing features allow beam angle limited source light to spread such that the light is sufficiently spread or mixed prior to introduction into the photoluminescent waveguide. Optionally, the graphic region may include two distinct planar regions oriented at some angle to each other, yet energized by remotely positioned light sources which introduce light to only one edge of each layer.

In accordance with an embodiment of this invention, a display system is comprised of one or more photoluminescent printed waveguides, and optionally an edge or back lit visible light illuminated graphic in the posterior position with optionally a light filter placed in between the translite graphic layer and the adjacent photoluminescent layer. Light is introduced into the edge of the photoluminescent printed waveguide by way of remotely positioned light sources in combination with one or more propagation direction changing features. Remote positioning of light sources and optionally additional obscuring features prevent direct viewing of the light source(s) by an observer.

In accordance with an embodiment of this invention, a display system is comprised of one or more photoluminescent printed waveguides, and optionally an edge or back lit visible light illuminated graphic in the posterior position with optionally a light filter placed in between the translite graphic layer and the adjacent photoluminescent layer. The display system able to support very thin graphic regions integrated into a vertical or horizontal edge of shelving wherein the light sources are introduced into the system remotely and the light is turned into the observer visible area via propagation direction changing features.

In accordance with an embodiment of this invention, a display system is comprised of one or more photoluminescent printed waveguides based on lightwave coupling, and a physical object posterior to the photoluminescent layers, and optionally a light filter placed in between the physical object(s) and the adjacent photoluminescent layer. Waveguide light sources are introduced into the system remotely and the light is turned into the observer visible area via propagation direction changing features. The photoluminescent printed waveguide is transparent or semi-transparent in the non-energized state. The optional light filter reduces the visibility of the physical object(s) to provide a sufficiently dark background for the photoluminescent layers when the photoluminescent layer(s) are energized. When the photoluminescent layers are not-energized, optional illumination may be temporarily directed towards the physical object(s) to increase visibility when viewed through the photoluminescent layers and to offset the light loss due to the light filter. If the physical object is primarily illuminated to one level continuously (for example a store owned cooler where the interior lights are on continuously), the light filter can be increased to reduce the background illumination such that it provides a sufficiently dark background for the photoluminescent layers when the physical object(s) is in the primary-illuminated state. In this case, additional secondary visible light source(s) may be provided to illuminate the physical object temporarily so as to compensate for the light loss due to the light filter. The system may be planar, non-planar, rectangular or contour cut.

In accordance with an embodiment of this invention, a display system is comprised of one or more photoluminescent printed waveguides based on lightwave coupling. The photoluminescent printing may be directly onto the waveguide or optionally onto film which is coupled to the waveguide. One or more ultra-violet, violet, or blue LED based light sources are introduced into the photoluminescent printed waveguide by way of remotely positioned light sources in combination with one or more propagation direction changing features. The propagation direction changing features allow beam angle limited source light to spread such that the light is sufficiently spread or mixed prior to introduction into the photoluminescent waveguide.

In accordance with an embodiment of this invention, a display system is comprised of one or more photoluminescent printed waveguides based on lightwave coupling. The photoluminescent printing may be directly onto the waveguide or optionally onto film which is coupled to the waveguide. One or more ultra-violet, violet, or blue laser based light sources are introduced into the photoluminescent printed waveguide by way of remotely positioned light sources in combination with one or more propagation direction changing features.

DETAILED DESCRIPTION OF THE INVENTION

Figure 1:
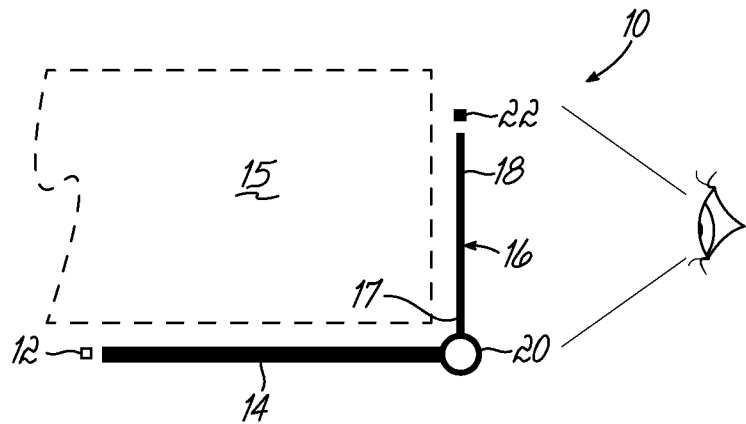
FIG. 1 is a diagrammatic cross-sectional view of a display system according to the present invention.

As shown in the figures, and in particular FIG. 1, the display system 10 of the present invention includes a remotely positioned light source 12, a first waveguide 14, a second waveguide 16 containing a photoluminescent printed image 18, and a first propagation direction changing feature 20. The function, benefits, and structural features of the display system 10 and its associated features are described below in connection with the respective Figures.

The remotely positioned light source 12 is configured to produce ultra-violet, violet, or blue light. As used herein, the remotely positioned light source 12 is intended to include any number of remotely positioned ultra-violet, violet, or blue light sources for energizing the photoluminescent printed image 18, such as light emitting diode "LEDs" or laser light sources, for example. Although shown on the bottom edge 17 of second waveguide 16, the remotely positioned light source 12 and the first waveguide 14 can be positioned along any edge of the second waveguide 16.

The first waveguide 14 receives the light from the remotely positioned light source 12, dispersing the generated light across the first waveguide 14, providing a uniform light along the entire waveguide 14 at the first propagation direction changing feature 20. The dimensions of first waveguide 14 are sufficient to allow beam angle limited light sources to spread the light prior to introduction into the propagation direction changing feature 20. The first propagation direction changing feature 20 receives the light from the first waveguide 14 and reorients the direction of the light into the second waveguide 16. The first propagation direction changing feature 20 reduces the out of plane angular light distribution such that waveguide thickness can be reduced while maintaining sufficient light distribution to support photoluminescent printed image 18.

The first propagation direction changing feature 20 may be either a distinct physical component of the first or second waveguides 14, 16 or may be an integrally formed as a unitary piece to either the first or second waveguides 14, 16. According to an exemplary embodiment, the first propagation direction changing feature 20 may be at least one of: a mirror, a prism, a surface grating, a diffraction grating, a reflective grating, a photonic crystal, or a bent optical waveguide. In the case of a prism as the propagation direction changing feature, the prism may have a reflective surface and one or more reflectors, so that when some of the light emanates out of the reflective surface (in this example at a 45 degree angle), the reflector redirects this errant light back to the second waveguide 16.

The second waveguide 16 is disposed at an angle relative to the first waveguide 14. As shown, the second waveguide 16 is disposed at a 90 degree angle relative to the first waveguide 14, however various other angles greater than 0 degrees and less than 180 degrees, and preferably between angles greater than 10 degrees and less than about 170 degrees are also suitable. As such, the first propagation direction changing feature 20 reorients the light preferably by more than 10 degrees and less than about 170 degrees, generally 90°.

As shown in FIG. 1, the photoluminescent printed image 18 is printed directly onto the second waveguide 16. The second waveguide 16 may include a transparent flexible film (such as a thin sheet) or a transparent rigid substrate, such that the photoluminescent printed image 18 is printed on the transparent flexible printed film that is laminated to the transparent rigid substrate. Such display systems are disclosed in U.S. Pat. No. 7,430,355 and PCT application WO2016/130419A1, the disclosures of which are hereby incorporated by reference.

The waveguides are any optically transparent material capable of propagating ultra-violet, violet, or blue light and having a refractive index higher than the refractive index of an environment surrounding the device 10. Suitable materials for constructing waveguides 14, 16 include, but are not limited to, silicon nitride (Si3N4), silicon oxynitride (SiON), borosilicate glass, aluminosilicate glass, float glass, and other optical glasses and polymers known by those skilled in the art of optics. Particularly suitable materials for the waveguides include organic polymethyl methacrylate (PMMA) and inorganic silicon dioxide (glass), each of which has a refractive index of about 1.5 at visible light wavelengths.

The waveguides may be flexible films. Suitable optical films include fluoropolymer films, plasma treated to accept ink.

Suitable materials forming for the photoluminescent layer 18 include perylene, coumarin, and other common fluorescent dyes, such as laser dyes, dispersed in a polymer host. Among the suitable materials are BASF Lumogen™ dyes dispersed in a polymethylmethacrylate (PMMA) matrix. Example dyes for red, green, and blue emission are Lumogen™300, Lumogen™083, and Lumogen™570, respectively. Suitable materials also include BASF Lumogen™ dyes in a high refractive index (n greater than about 1.5) polymer such as Brewer Science OptiNDEX A07. Suitable materials also include perylene, coumarin, or other commons laser dyes, doped into a polyvinylchloride (PVC) or polyvinyl butryal (PVB) matrix. Suitable materials also include dye or phosphor powder-doped materials such as DuPont TEFLON® AF fluoropolymer that has a refractive index of about 1.3.

The image can be printed on the front or rear surface of waveguide 16. When energized by the ultra-violet, violet, or blue light, the photoluminescent printed image 18 is viewable by an observer. Additionally, while not shown, the image may be printed on a transparent flexible film fixed to the front or rear surface of the second waveguide 16. In the non-energized state, the photoluminescent features of photoluminescent printed image 18 are transparent or semi-transparent. As used herein, the photoluminescent printed image 18 may include one or more of emissive images, lines of text, and graphic elements, alone or in combination with one another. For example, the photoluminescent printed image 18 may include multiple lines of text, multiple graphic elements and multiple images, or the photoluminescent printed image 18 may include just multiple lines of text (for example).

As shown, a reflector 22 may be incorporated into the display system 10 to redirect the light back to the photoluminescent printed image 18 on the second waveguide 16. More or less reflectors 22 may also be used. FIG. 1 shows one first waveguide 14 and one second waveguide 16. But the invention may include a plurality of first and second waveguides, stacked on one another as explained below. Each pair of first and second waveguides will include a separate remotely positioned light source 12 and first propagation direction changing feature 20 as well as a photoluminescent printed image 18. Further, the display system 10 can be for example a shelf strip with the first waveguide 14 and the remotely positioned light source 12 below a shelf 15 (shown in phantom).

In other embodiments, the display can be a contour cut display system, a three dimensional display system, a non-rectangular or curved display. Other embodiments are discussed in more detail below.

Figure 2:
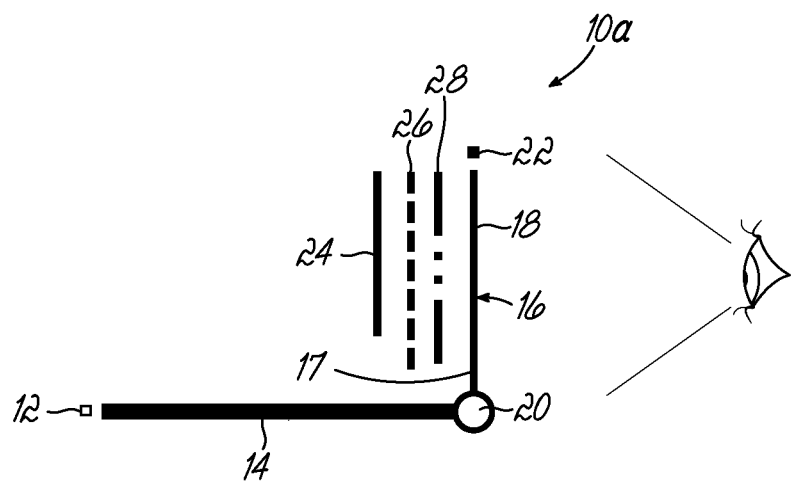
FIG. 2 is a diagrammatic cross-sectional view of another display system according to the present invention.

FIG. 2 shows an alternate display system 10a, that is similar to the display system 10 of FIG. 1, where like reference numerals refer to like features. Similar to the previous embodiment, the remotely positioned light source 12 emits light in the ultra-violet, violet, or blue spectrum. A first propagation direction changing feature 20 turns the light into the second waveguide 16. The first waveguide 14 delivers the light to the second waveguide 16 containing the photoluminescent printed image 18 to energize the photoluminescent printed image 18 on the second waveguide 16. A reflector 22 may be incorporated to turn the light back into the photoluminescent printed image 18.

Figure 3:
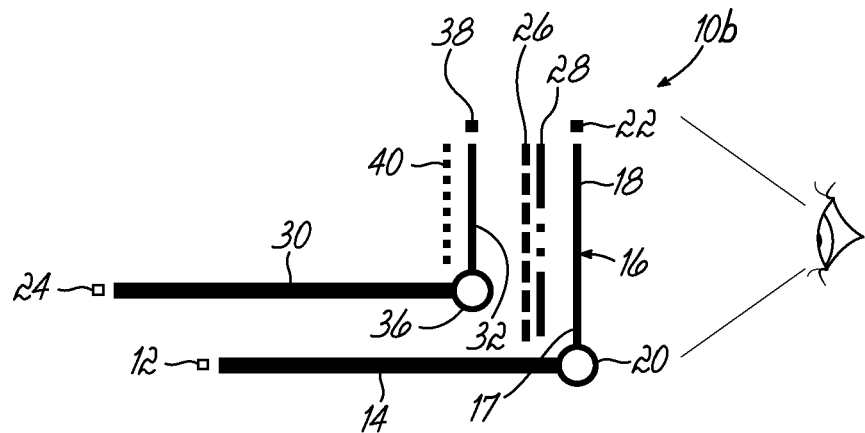
FIG. 3 is a diagrammatic cross-sectional view of another display system according to the present invention.

The display system 10a also includes a visible light source 24 configured to produce visible light (such as visible white light), a translite graphic layer 26, and a filter layer 28. When the second waveguide 16 is energized by the remotely positioned light source 12, the filter layer 28 provides a dark background for the photoluminescent printed image 18. For example, the filter can be a neutral density filter with a trasmittance of 50% to 6.25%. The second waveguide 16 allows the translite graphic layer 26 to be visible when illuminated by the visible light source 24. The translite graphic layer 26 provides a display element which can be illuminated for a very long time without significant color loss. The translite graphic layer 26 is positioned behind the rearmost waveguide (with respect to the observer) if a system has more than one photoluminescent image layer. The translite graphic layer 26 can be illuminated by edge or back lighting. The translite graphic layer 26 may contain up to 100% white content. FIG. 3 shows a further alternative display system 10b of the present invention, that is similar to the display system 10a of FIG. 2, where like reference numerals refer to like features. The remotely positioned light source 12 energizes the photoluminescent printed image 18 on the second waveguide 16. The first propagation direction changing feature 20 turns the light into the photoluminescent printed image 18. A reflector 22 turns the light back into the photoluminescent printed image 18. The filter layer 28 provides a sufficiently dark background for the photoluminescent printed image 18 when the photoluminescent printed image 18 is energized.

The display system 10b also includes a visible light source 24 configured to produce visible light, a third waveguide 30 that receives the visible light from the visible light source 24, and a visible light emanating waveguide 32, and a second propagation direction changing feature 36. The second propagation direction changing feature 36 receives the visible light from the third waveguide 30 and redirects the visible light into the visible light emanating waveguide 32. When illuminated by the visible light emanating waveguide 32, the translite graphic layer 26 becomes visible. The visible light emanating waveguide 32 is disposed at an angle relative to the third waveguide 30

The photoluminescent printed images 18, 32 may be separated, so as to maximize the visible area of the photoluminescent printed images 18, 32. An optional visible light reflector 38 redirects the visible light back into the visible light emanating waveguide 32. The visible light reflector 38 may be the same or different than the reflector 22. A reflective layer 40 directs the visible light emanating from the visible light emanating waveguide 32 towards the translite graphic layer 26.

Figure 4:
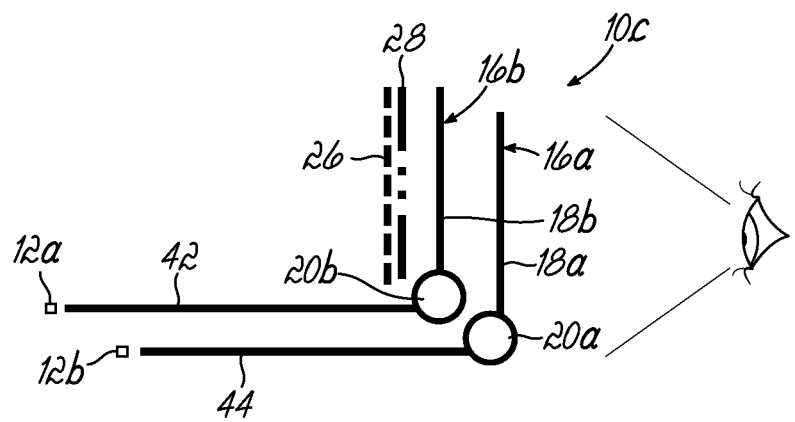
FIG. 4 is a diagrammatic cross-sectional view of another display system according to the present invention.

FIG. 4 shows yet another alternative display system 10c of the present invention, that is similar to the display systems 10a and 10b of FIGS. 2 and 3, where like reference numerals refer to like features. FIG. 4 shows two remotely positioned light source 12a, 12b, two second waveguides 16a, 16b arranged adjacent one another with two corresponding photoluminescent printed images 18a, 18b, with one of the photoluminescent printed images 18 being disposed on each of the second waveguides 16a, 16b. However, more second waveguides 16 are also envisioned, just not shown. Two first propagation direction changing features 20a, 20b are also included. The second waveguides 16a, 16b may be in the form of a transparent flexible film or a transparent rigid substrate. The photoluminescent printed images 18 may be formed on the transparent flexible film which is laminated to a rigid substrate. The second waveguides 16 are capable of being energized by excitation light in the ultra-violet, violet, or blue range to produce emissive imagery, text or graphic features wherein the photoluminescent features are transparent or semi-transparent in the non-energized state.

The display system 10c also includes a translite graphic layer 26 and a filter layer 28. The filter layer 28 is disposed between the rearmost photoluminescent layer 18b and the translite graphic layer 26. The filter layer 28 provides a dark background for the photoluminescent printed image 18 when the photoluminescent printed image 18 is energized, yet alternatively, allow the translite graphic layer 26 to be visible when image 18 is not energized.

Figure 7:
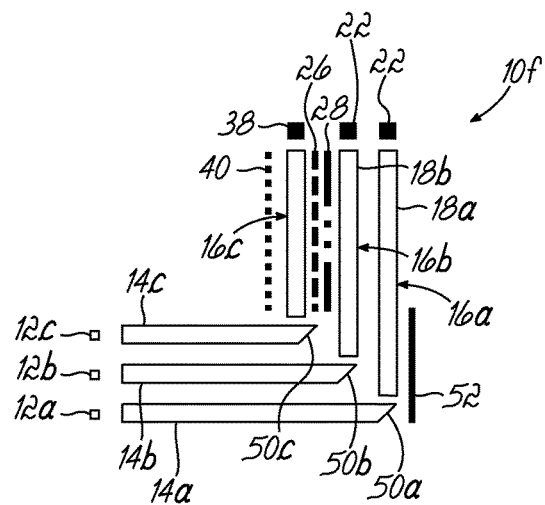
FIG. 7 is diagrammatic cross-sectional view of another display system according to the present invention.

A keyed configuration is obtained by stacking together one or more edges of the second waveguides 16 with receiving features 42, 44 to prevent misalignment (also shown in FIG. 7). The translite graphic layer 26, the filter layer 28, and the second waveguides 16 form a keyed configuration by staggering ends of the second waveguide so that the second waveguides, optional translite graphic layer 26, and optional filter layer 28 can only be installed in the correct position and orientation.

Figure 5:
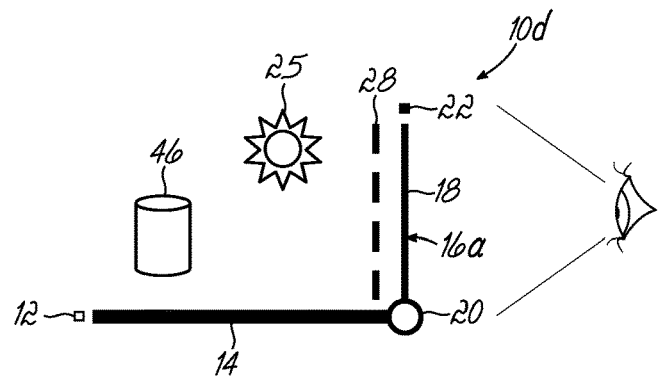
FIG. 5 is a diagrammatic cross-sectional view of another display system according to the present invention.

FIG. 5 is a cross-sectional view of a display system 10d, that is similar to the display system 10 of FIG. 1, where like reference numerals refer to like features. The remotely positioned light source 12 energizes the photoluminescent printed image 18 on the second waveguide 16. The first waveguide 14 delivers the light to the second waveguide 16 containing the photoluminescent printed image 18. The first propagation direction changing feature 20 turns the light into the first printed image of the second waveguide, which may be located on a separate printed film. The reflector 22 may turn the light back into the photoluminescent printed image 18.

The display system 10d also includes a visible light source 24 configured to produce visible light, such as visible white light. A filter layer 28 provides a sufficiently dark background for the photoluminescent printed image 18, yet also allows one or more three-dimensional physical objects 46 to be visible when illuminated. In some configurations, a visible light source 24 is not required to illuminate the three-dimensional physical object 46.

The visible light source 24 is configured to produce visible light for the three-dimensional physical object 46 posterior to the display system 10d. The photoluminescent printed image 18 is viewable in an energized state and non-viewable in a non-energized state such that the three-dimensional physical object 46 may be viewed through the photoluminescent printed image 18. The filter layer 28 provides a dark background for the photoluminescent printed image 18, while allowing the three-dimensional physical object 46 to be visible when illuminated. For example, the display system 10d may include more than one ultra-violet, violet, or blue light sources 12 and more than one associated illuminated photoluminescent images, and one visible light source 24, with an optional filter between the most anterior photoluminescent image and the three-dimensional physical object.

Alternately, remotely positioned light source 12 and first waveguide 14 can be positioned in front of the second waveguide as seen by the observer. Also, the second initial propagation direction changing feature 50 and visible light source 24 and third waveguide 30 can be positioned in front of the second waveguide as seen by the observer (the filter stays in the same position relative to the object).

Figure 6:
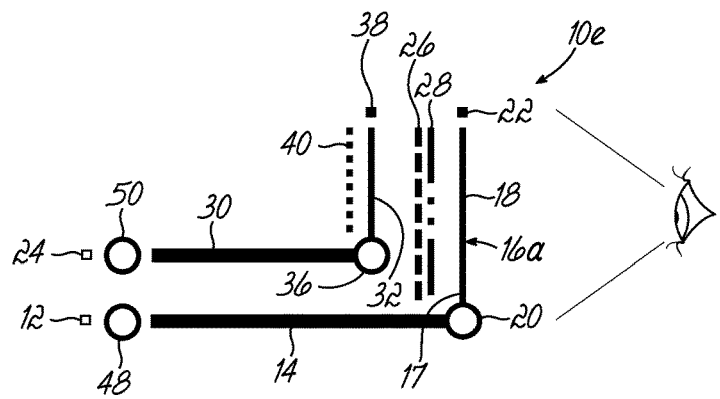
FIG. 6 is a diagrammatic cross-sectional view of another display system according to the present invention.

FIG. 6 is a cross-sectional view of a display system 10e, that is similar to the display system 10b of FIG. 3, where like reference numerals refer to like features. The remotely positioned light source 12 energizes the photoluminescent printed image 18 on the second waveguide 16. The first waveguide 14 delivers the light to the second waveguide 16 containing the photoluminescent printed image 18. The first propagation direction changing feature 20 turns the light into waveguide 16a. The reflector 22 turns the light back toward photoluminescent printed image 18.

The display system 10e includes a visible light emanating waveguide 32 that illuminates the translite graphic layer 26. The filter layer 28 provides a sufficiently dark background for the photoluminescent printed image when the photoluminescent printed image 18 is energized, yet allows the translite graphic layer 26 to be visible when illuminated by the visible light emanating waveguide 32. The visible light source 24 introduces light into the waveguide 30. A second propagation direction changing feature 36 turns the light into the visible light emanating waveguide 32. A visible light reflector 38 turns the visible light back into visible light emanating waveguide 32. An optional reflective layer 40 directs the light emanating from visible light emanating waveguide 32 towards the translite graphic layer 26.

As shown, a first initial propagation direction changing feature 48 may receive the light from remotely positioned light source 12 and shapes the light into the first waveguide14. Also, a second initial propagation direction changing feature 50 may receive the visible light from the visible light source 24 and shapes the visible light into third waveguide 30. More or less initial propagation direction changing features are also envisioned. The purpose of the first and second initial propagation direction changing features 48, 50 is to shape the ultra-violet, violet, or blue light and visible light so that it can be introduced into the second waveguide 16 and the visible light emanating waveguide 32 with better distribution. The first and second initial propagation direction changing features 48, 50 may be used with either This applies to rigid waveguides or film waveguides. For rigid waveguides, the light can enter the waveguide from the end, or normal to surface via a grating and TIR features. For thin film waveguides, the light can enter only through the surface, not the end. The first and second initial propagation direction changing features 48, 50 may be either distinct physical components from the first or third waveguides 14, 30 respectively, or may be an integral feature to either the first or third waveguides 14, 30 respectively.

EXAMPLE #1

According to an illustrative example, a display system 10*f* as shown in FIG.7, was assembled using three 12 inches long 0.118 inches thick clear Evonik FF grade acrylic plates to serve as the optic between LEDs and the graphic layer. Three first waveguides 14*a*, 14*b*, 14*c* as well as three second waveguides 16*a*, 16*b*, 16*c* are shown (exploded to show detail). As assembled, these waveguides actually rest on each other. The second waveguide 16*a* which supports the photoluminescent printed image 18*a* (front image) was cut to 2 inches wide. The second waveguide 16*b* supporting the photoluminescent printed image 18*b* (middle image) was cut to 2 inches minus 0.118 inches. The visible light emanating waveguide 16*c* supporting the translite graphic 26 (back image) was cut to 2 inches minus 0.236 inches. For each, the opposing long edge was cut to a 45 degree angle 50*a*, 50*b*, 50*c*. The 45 degree cut was hand polished using 400 grit and then buffed to a clear surface. The three waveguides 16*a*, 16*b* and 16*c* were then stacked into the frame such that the 45 degree cut surfaces were facing down. This provides the first propagation direction changing feature.

LED strips, acting as remotely positioned light sources 12*a*, 12*b*, having a wavelength of 395-405 nanometers were taped to these waveguides along the square long edge of the bottom and middle waveguide. The LEDs were 3020 package with an angular distribution of +/−60 degrees. They were placed on half inch centers along the strips. A white light led strip 12*c* from P-LED.COM comprised of an 8 inch section (part number PL-SP4-MW8-N) and a 2.67 inch section (part number PL-SP4-MW3-N) was taped to the square long edge of the top waveguide. These LED strips were connected to a control unit which alternates power to the three waveguide levels.

A 12 inch by 2 inch Evonik Endlighten white light panel 16*c* was positioned to receive the white LED light from the supporting waveguide 14*c* as it turns from the horizontal plane to the vertical plane due to the 45 degree cut previously described. To increase white light emission, a white plastic highly reflective film was placed behind the Endlighten panel. A reflector, in the form of reflective tape 38, was applied to the sides and top of this panel to return light back into the panel.

Two 12 inch by 2 inch long 0.118 inch thick Evonik clear FF grade acrylic image layers 16*a*, 16*b* were printed with Sun Chemical produced semi-transparent photoluminescent screen inks sold through Transitions Digital Graphics, LLC. The edges were flame polished. A reflector 22, in the form of reflective tape, was applied to the sides and top of these panels to return light back into the panels. These image layers were stacked such that the front image extended towards the bottom by 0.118 inches longer than the middle image layer. Lee Filter #21128 was cut and affixed to the back of the middle image layer 16*b* to sufficiently reduce visibility of the translite when the photoluminescent panels are energized, yet still allow the translite to present a useful image when the Endlighten panel 16*c* is illuminated with white light. A 12 inch by 2 inch translite printed by SBPI Graphics 26 was attached to the image stack behind the filter film 28 and a reflector film 40 was positioned behind waveguide 16*c*. The stack was taped together.

This keyed stack was installed in front of the Endlighten panel and on top of both the waveguide supporting the front image and the waveguide supporting the middle image such that the 395-405 nanometer LED light enters the front and middle image layers as it turns from the horizontal plane to the vertical plane due to the 45 degree cuts previously described.

The frame lip 52 extending upwards from the bottom consumed only 3/16 inch of observer viewable area. The top edge of the photoluminescent images is fully visible up to the reflective tape. The top edge of the translite filter layer is fully visible.

In all of these embodiments, the light source is out of plane with the image carrying waveguide. This allows one to maximize the area of the image.

This has been a description of the present invention along with preferred method of practicing the present invention, however, the invention itself should be defined only by the appended claims, wherein we claim:

1. A display system comprising:
   a remotely positioned light source configured to produce ultra-violet, violet, or blue light;
   a first waveguide that receives the light from the remotely positioned light source;
   a second waveguide disposed at an angle relative to the first waveguide, the second waveguide containing a photoluminescent printed image; and
   a first propagation direction changing feature reorients the direction of the light into the second waveguide.

2. The display system of claim 1, wherein the first propagation direction changing feature is integrally formed as a unitary piece to one of the first and second waveguides.

3. The display system of claim 1, wherein the first propagation direction changing feature is a separate component from the first and second waveguides.

4. The display system of claim 1,
   wherein the first propagation direction changing feature is ONE OF a grating or a normal to in-plane lens feature, and
   wherein the first propagation direction changing feature reorients the light preferably by more than 10 degrees and less than about 170 degrees.

5. The display system of claim 1, wherein the first propagation direction changing feature is at least one of: a mirror, a prism, a surface grating, a diffraction grating, a reflective grating, a photonic crystal, or a bent optical waveguide.

6. The display system of claim 1 further comprising:
   a second propagation direction changing feature that receives the light from remotely positioned light source and reorients the direction of the light into the first waveguide.

7. The display system of claim 1, wherein the first propagation direction changing feature receives light from the first remotely positioned light source and does at least one of collimating, condensing and distributing the light into the first waveguide.

8. The display system of claim 1, further comprising a first reflector redirects the light back to the photoluminescent printed image on the second waveguide.

9. The display system of claim 1, wherein the photoluminescent printed image is printed directly onto the second waveguide.

10. The display system of claim 1, wherein the a remotely positioned light source positioned at least: behind, in front of, above, below, to the left, or to the right of the first waveguide.

11. The display system of claim 1 further comprising:
a visible light source configured to produce visible light;
a translite graphic layer; and
a filter layer disposed between the second waveguide with the photoluminescent printed image and the translite graphic layer providing a dark background for the photoluminescent printed image when the photoluminescent printed image is energized, and allows the translite graphic layer to be visible when illuminated by the first visible light source.

12. The display system of claim 11, wherein the filter layer is a film that is directly connected to the translite graphic layer.

13. The display system of claim 1 further comprising:
a visible light source configured to produce visible light;
a third waveguide that receives the visible light from the first visible light source;
a visible light emanating waveguide disposed at an angle relative to the third waveguide;
a translite graphic layer for receiving the visible light; and
a second propagation direction changing feature that receives the visible light from the third waveguide and redirects the visible light into the visible light emanating waveguide.

14. The display system of claim 1 further comprising:
a first initial propagation direction changing feature that receives the light from remotely positioned light source and reorients the direction of the light into the first waveguide,
wherein the first initial propagation direction changing feature is integrally formed as a unitary piece to the first waveguide.

15. The display system of claim 1 further comprising:
a second propagation direction changing feature that receives the light from remotely positioned light source and reorients the direction of the light into the first waveguide, wherein the first initial propagation direction changing feature is a separate component than the first waveguide.

16. The display system of claim 13, wherein the display system is a shelf strip, with the visible light source being positioned at least: behind, in front of, above, below, to the left, or to the right of the third waveguide.

17. The display system of claim 13, wherein the filter layer is between the translite layer and the adjacent photoluminescent layer.

18. The display of claim 13, further comprising a second reflector which redirects the light back to the first visible light emanating waveguide.

19. The display system of claim 13 further comprising:
a third propagation direction changing feature that receives visible light from the visible light source and reorients the direction of the visible light into said third waveguide.

20. The display system of claim 13, wherein the first and second photoluminescent printed images and the translite graphic layer are separate from second waveguide so as to maximize the visible area of the first and second photoluminescent printed images and translite graphic.

21. The display system of claim 1 further comprising:
a visible light source configured to produce visible light; and
a three-dimensional physical object contained within the display system,
wherein the photoluminescent printed image is viewable in an energized state and non-viewable in a non-energized state such that the three-dimensional physical object is viewable through the photoluminescent printed image.

22. The display system of claim 21, wherein the three-dimensional physical object is contained within an enclosure.

23. The display system of claim 21 further comprising:
a filter layer providing a dark background for the first photoluminescent image, while allowing the three-dimensional physical object to be visible when illuminated.

24. The display system of claim 1, wherein the display system is a contour cut display system or a three dimensionally formed display system.

25. The display system of claim 11, wherein the display system is a contour cut display system.

26. The display system of claim 11 wherein the image is three-dimensional.

27. The display system of claim 1, wherein the display system is a shelf strip.

28. The display system of claim 1, wherein the display system is a light box with a physical object inside said light box, with the physical object being positioned behind the photoluminescent printed image.

29. The display system of claim 13, further comprising
a translite graphic layer; and
a filter layer disposed between the translite graphic layer and the photoluminescent printed image providing a dark background for the photoluminescent printed image when the photoluminescent printed image is energized, yet alternatively allowing the translite graphic layer to be visible when non-energized by the first visible light source,
wherein the translite graphic layer, the filter layer, and the second waveguide form a keyed configuration by staggering ends of the second waveguide, the translite graphic layer and the filter layer so that the second waveguide, the translite graphic layer, and the filter layer can only be installed in the correct position and orientation.

30. A method of displaying a photoluminescent printed image, the method comprising:
producing ultra-violet, violet, or blue light using a remotely positioned light source;
transferring the light to a first waveguide that receives the light from the remotely positioned light source;
reorienting the direction of the light using a first propagation direction changing feature after receiving the light from the first waveguide; and
transferring the light to a second waveguide containing a photoluminescent printed image; the second waveguide being disposed at an angle relative to the first waveguide.

31. The display system of claim 1 wherein said second waveguide is thin film.

32. The display system of claim 13 wherein said visible light emanating waveguide is a flexible film.

* * * * *